H. H. KUENTZ.
EGG CASE.
APPLICATION FILED MAY 5, 1919.
1,320,069.
Patented Oct. 28, 1919.
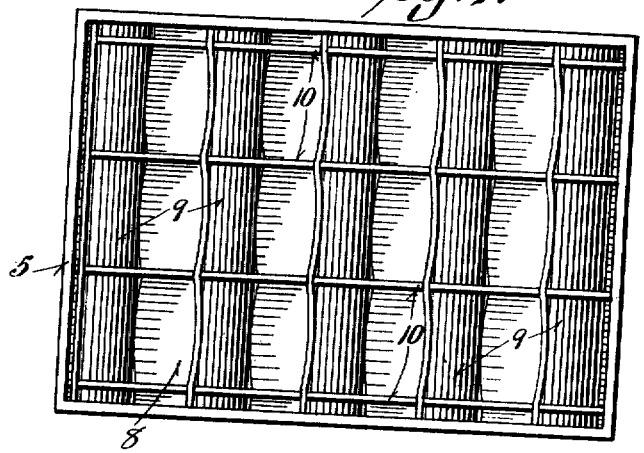
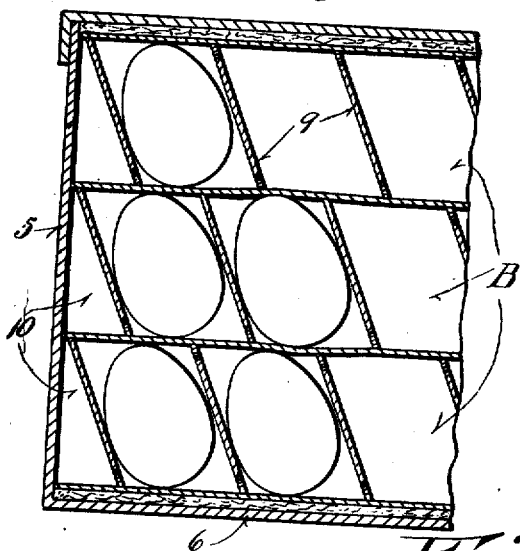
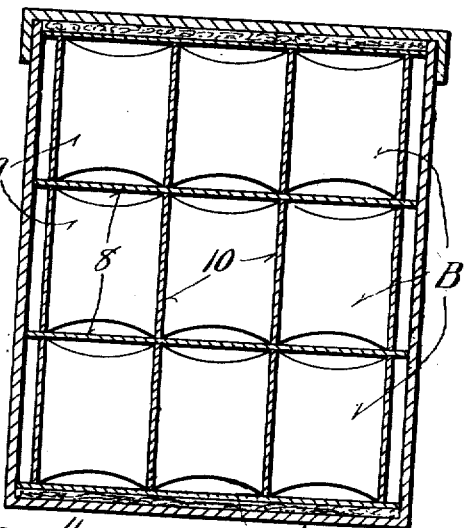
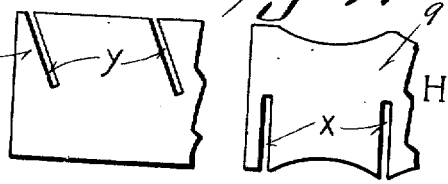
Witness:
T. F. Britt
Inventor:
Herman H. Kuentz
By Young & Young
Attorneys ic
UNITED STATES PATENT OFFICE.

HERMAN H. KUENTZ, OF MILWAUKEE, WISCONSIN.

EGG-CASE.

1,320,069.  Specification of Letters Patent. Patented Oct. 28, 1919.

Application filed May 5, 1919. Serial No. 294,826.

*To all whom it may concern:*

Be it known that I, HERMAN H. KUENTZ, a citizen of the United States, and resident of Milwaukee, in the county of Milwaukee and State of Wisconsin, have invented certain new and useful Improvements in Egg-Cases; and I do hereby declare that the following is a full, clear, and exact description thereof.

My invention relates to new and useful improvements in cellular structures for packing eggs or like fragile articles, and more particularly of the type shown in my co-pending application for patent filed January 27, 1919, Serial No. 273,292, and comprising tiers of cellular filler members each formed of series of crossed strips slotted for mutual engagement, one series of strips of each filler member having the upper edges of the strips concaved between the other series of strips to provide a cushioning action for vertical stresses, the concaved strips being staggered throughout the tiers to dispose said concaved strips directly under the eggs or other articles disposed in the superposed tiers.

In carrying out this arrangement in my aforementioned application for patent, alternate series of idle half cells were formed at the ends of the packing members to procure a vertically staggered relation of the concaved strips. It is the object of my present invention to provide an arrangement avoiding the necessity of providing such series of half cells, and it is more particularly my object to effect the vertically staggered relation of the concaved strips in a manner which at the same time affords an increased cushioning action of the cellular structure.

With the above and other objects and advantages in view, which will be apparent as the description proceeds, my invention resides in the novel features of construction, combination and arrangement of parts, which will be hereinafter more particularly described and defined by the appended claim.

In the accompanying drawings:

Figure 1 is a plan view of a packing structure embodying my invention.

Fig. 2 is a vertical sectional view through the structure.

Fig. 3 is a vertical sectional view through the structure on a plane at right angles to the plane of Fig. 1.

Fig. 4 is an elevational view of a pair of mating filler sections.

As in my said co-pending application, my improved packing structure comprises superposed tiers of packing members B disposed within a box including the walls 5 and bottom 6, said tiers being separated by horizontal sheets 8 which form the bottoms of the egg receiving compartments or cells. Each of the cellular packing members B is formed of the usual crossed series of spaced strips 9 and 10 oppositely slotted to dispose the side edges of the strips in the top and bottom planes of the cellular packing member and to form rows of egg receiving compartments or cells, the series of strips 9 being concaved between the strips 10 to effect a cushioning action when disposed under the eggs contained in a superposed packing member B.

In carrying out my present invention, the slots of the concaved strips 9 extend at right angles from their edges in the usual manner, but the slots *y* of the straight strips 10 are extended obliquely with respect to the edges of the strips. Thus, when the strips are assembled, the strips 9 are obliquely inclined with respect to the strips 10 and with respect to the top and bottom planes of the packing member, the inclination of the strips 9 being such that their upper edges are offset laterally of the lower edges a distance equal to half the width of a cell or compartment.

The desired staggered relation of the concave edges of the strips 9 when the packing members are disposed in superposed tiers is thus effected without the necessity of providing definite idle half cells at one end of each packing member B. At the same time, an important advantage is effected which possesses independent value in that vertical jarring stresses imparted to the eggs will be transmitted against the inclined strips and thus increase the desired cushioning action.

While I have shown and described a preferred embodiment of my invention, it will be appreciated that various changes and modifications of structure may be employed to meet differing conditions of use and manufacture without departing in any manner from the spirit of my invention.

What is claimed is:

A packing structure comprising superposed cellular packing members each including crossed series of spaced strips slotted for mutual engagement to form rows of cells, the slots of one series of strips extending obliquely therein whereby to dispose the other series of strips obliquely with relation to the top and bottom planes of the packing members, the edges of said other series of strips being provided with concavities between the first strips, and bottom sheets disposed between the packing members, the oblique disposition of said concaved strips disposing the edges of said strips in vertically staggered relation throughout the series of packing members.

In testimony that I claim the foregoing I have hereunto set my hand at Milwaukee, in the county of Milwaukee and State of Wisconsin.

HERMAN H. KUENTZ.